FAST-ACTING CURRENT LEVEL SHIFTER

Filed Oct. 22, 1963

INVENTOR.
WOLFGANG SCHREDER
BY Pauser Hemminger
Attorney 3,297,881

FAST-ACTING CURRENT LEVEL SHIFTER

Wolfgang Schreder, Mountain View, Calif., assignor to International Telephone and Telegraph Corporation, New York, N.Y.

Filed Oct. 22, 1963, Ser. No. 317,998
10 Claims. (Cl. 307—88.5)

This invention relates in general to constant current generators having a plurality of output levels and in particular to arrangements for reducing the delay in changing from one constant output level to another.

Constant current generators are known which automatically compensate for line resistance variations in order to maintain a constant current on the line. Since line resistance changes are usually small during any short time interval, these known generators respond sufficiently rapid to maintain a constant current on the line. However, under certain applications, it is necessary that the current level be switched from a quiescent value to a different value with a minimum of delay. Also, under other conditions it may be desirable to utilize the constant current generator to supply a constant current at a plurality of different amplitude levels, which levels correspond respectively to signalling conditions on the line. One specific application of the latter situation arises from the use of a constant current generator to provide a constant current of an amplitude indicative of the signal strength of radio receiver signals. In such applications if the strength of the received signals remains constant, the current on the line remains constant. When the strength of the received signals changes to a new level, the current on the line increases to the new level and then remains constant at the new level until the signals again change. As is well known, a transmission line has capacitance and inductance characteristics which tend to oppose the rapid change from one current level to another. Thus, substantial delay is encountered in rapidly changing from one constant current level to another. It is accordingly an object of this invention to provide new circuitry which may be used with a constant-current generator, for example, which can rapidly change from one constant current level to another with a minimum of delay.

A feature related to the immediately preceding object resides in a unique switch and capacitance circuit arrangement wherein changes in output level are effected with a minimum of undesirable current surges or fluctuations.

Other objects and features of the invention will become apparent and the invention will be best understood when the specification and claims are read in conjunction with the accompanying drawings comprising FIGS. 1 to 3 wherein:

Figure 2:
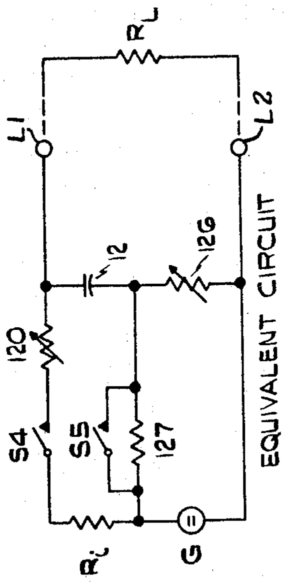
FIG. 2 shows an equivalent circuit of the unique circuitry disclosed in FIG. 1.

Referring first to FIG. 2 of the drawings, the equivalent circuit of the inventive constant current generator will be described.

Generator G represents a step-controlled voltage generator having a plurality of constant outputs controlled in accordance with incoming control signals. This output is passed to the constant current generator circuitry having an internal impedance designated R*i* which regulates the current passing through switch S4 to the line load designated by $R_L$ and comprising inductive and capacitive reactances. As is well-known, the constant current generator compensates for variations in line impedances and supplied to the line, a constant current of an amplitude determine by the generator G.

Normally, when the generator output is stepped up, the constant current generator will correspondingly increase the current level and then maintain it constant at the new level. However, during the transient interval that the current level is being changed, the capacitances and inductances in the line cause substantial delays in effecting the noted change and also cause surge potentials to appear on the line. The inventive arrangement overcomes these disadvantages.

A large capacitance 12 and adjustable resistance 126 are bridged across the line load with the junction between capacitance 12 and resistance 126 being connected through resistance 127 or switch S5 to the generator G output, independently of the constant current generator impedance R*i*.

When switches S4 and S5 are both open, resistance 126 of the voltage divider, consisting of resistances 127 and 126, is adjusted to charge capacitance 12 to the desired voltage required to obtain a predetermined current through load $R_L$. Thereafter, switch S4 is closed and all of the current from the constant current generator will flow into the line load and none will flow into capacitance 12 since it is already charged. Thereafter, switch S5 is closed to place capacitor 12 in series with the capacitance of the line. Thus, when the constant current output is first connected to the line, negligible delay is encountered in the current changing from a quiescent level to a new level.

When the output of the generator G is increased, the charge on capacitance 12 is increased quite rapidly since switch S5 permits rapid changes of the charge on capacitance 12. It is to be noted that the delay reducing circuitry is adjusted to correctly compensate for sudden current level variations within a given range. Under different current range shifts, the compensation will be too great and generate surges or be too small and introduce excessive delay.

Figure 1:
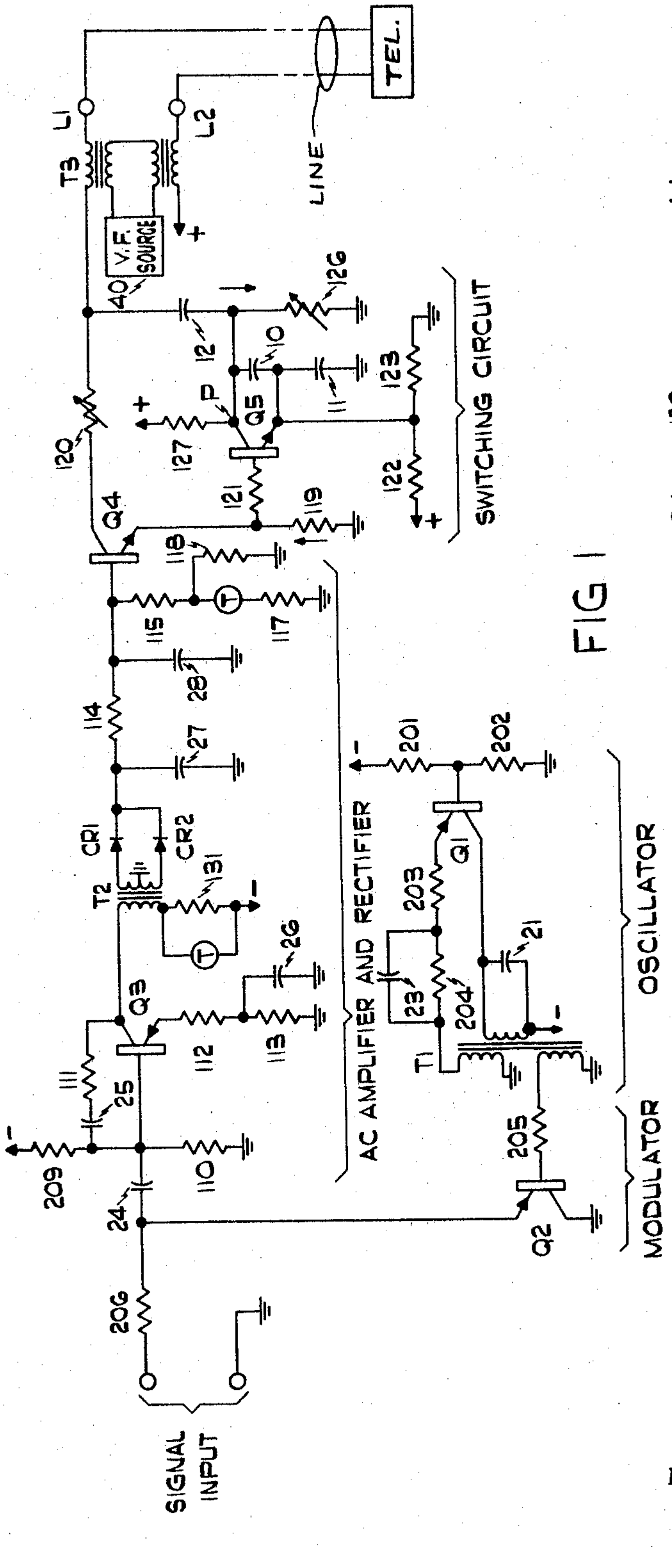
FIG. 1 shows a schematic diagram of the circuit of the inventive delay reducer shown embodied in a constant current generator.

Referring now to FIG. 1 of the drawings, a detailed description of the operation of the constant current generator delay reducer will be given.

The inventive equipment is remotely located from central control equipment and is coupled thereto by a voice frequency transmission line or cable having a pair of line conductors L1 and L2. These line conductors may be the well known tip and ring conductors extending to a subscriber station—either directly or through any known central office equipment. As those skilled in the art know, these conductors are normally bridged together at subscriber hookswitch contacts or any convenient central office equipment to form a completed line loop. The impedance of this line loop is shown as an equivalent resistance $R_L$ in FIG. 2. Voice frequency signals are transmitted over this line from a voice frequency source such as 40 which is inductively coupled to the line through transformer T3. While not shown, the transformer T3 is equipped with various taps and capacitances to match the impedance of the transmission line.

It has been chosen to illustrate the invention as associated with the noted transmission line. However, it is to be understood that any metallic pair of line conductors could be utilized equally well.

A pair of signal input terminals are shown on the left hand side of the drawings. These terminals receive direct current signals of amplitudes indicative of the level of constant current to be transmitted over the transmission line.

Transistor Q1, tuned transformer T1 and associated resistances 201 to 204 comprise a well-known tuned-collector-emitter feedback oscillator operating at a frequency of approximately 36 kc. This oscillator provides carrier switching power to a shunt modulator comprising transistor Q2 which modulates the carrier frequency with the direct current potential appearing on the input terminals. The output of the shunt modulator is essentially a 36 kc. square wave which is capacitively coupled to transistor amplifier Q3 through capacitance 24.

Transistor amplifier Q3 is biased by resistances 209, 110, 112 and 113 and has a negative feedback through resistance 111 and capacitance 25 to stabilize the gain of the amplifier stage and the input and output impedances of transistor Q3.

The square wave output from transistor Q2 is amplified and fed through transformer T2 to the full wave rectifier comprising diodes CR1 and CR2. The rectified direct current output is smoothed by the network consisting of capacitances 27 and 28 and resistance 114 resulting in a direct current voltage of an amplitude proportional to the input signals. This direct current voltage drives transistor Q4.

Transistor Q4 and associated circuitry comprises a constant current source to supply direct current to the transmission line.

The network consisting of resistances 117 and 118 and thermistor T provides temperature compensation for transistor Q4. The collector of transistor Q4 is connected to the transmission line through resistance 120 which is adjusted to build up the loop resistance to a specified value so that the current thereover may be set to any desired level with a given direct current input signal. Transistor Q4 obtains its collector supply potential from the positive source connected to line conductor L2, the circuit being completed via the line loop (resistor $R_L$ in FIG. 2).

When the rectified direct current on the base of Q4 is varied, the amount of current being sent over the transmission line will vary accordingly. Normally, when the current is increased or decreased, the capacitive and inductive impedances of the line preclude the change from being effected rapidly as the rise or decrease is exponential. However, the present invention overcomes this disadvantage by providing the delay reducer circuitry comprising transistor Q5, capacitance 12 and associated circuitry.

When the signal level on the base of transistor Q4 is changed, the conductivity of transistor Q4 is changed and a greater or smaller direct current is passed to the line conductor L1 from ground at resistance 119 through the emitter and collector of transistor Q4. As shown by curve *a* in FIG. 3, the load current from transistor Q4 is generally exponential in changing from one level to another. The time interval between $t_0$–$t_2$ is the normal delay encountered by prior-art system in switching from one level to another.

At the time that transistor Q4 alters its conductivity, the bias on the base of transistor Q5 is correspondingly changed, and transistor Q5 alters its conductivity and the potential at point P is changed. Since the potential at point P appears on one side of capacitance 12, capacitance 12 must alter its charge to match the new potential thereacross. Thus, a surge of line current, shown generally as curve *b* of FIG. 3, appears on the line. This surge of current caused by the change in conductivity of transistor Q5 is generally exponential and disappears after the expiration of time interval $t_0$–$t_1$.

Figure 3:
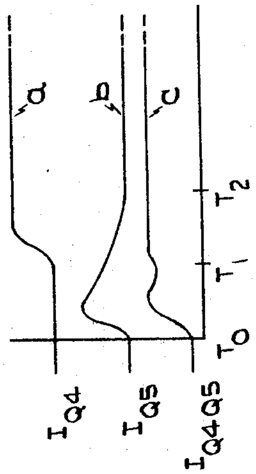
FIG. 3 graphically shows exemplary line currents controlled by the various components of the circuitry of FIG. 1.

The algebraic sum of the line currents controlled individually by transistor Q4 and by transistor Q5 is shown as curve *c* in FIG. 3. As can be seen by curve *a*, the line current controlled by transistor Q4 stabilizes at time point $t_2$ and the surge current controlled by transistor Q5 disappears. Thus, the transition from one level to another is effected in a shorter time interval by using the inventive arrangement.

While FIG. 3 disclosed increases in line current, a similar result would prevail on decreases in line currents.

Capacitance 10, bridged across the emitter-collector of transistor Q5, serves to maintain an A.C. balance on the line by bypassing the resistance of transistor Q5.

The values of resistances 120 and 126 are selected to meet the various line loop resistances of the transmission lines employed.

While I have described above the principles of my invention in connection with specific apparatus, it is to be clearly understood that this description is made only by way of example and not as a limitation to the scope of the invention.

I claim:

1. A circuit arrangement comprising a transmission line having an inherent impedance including at least some capacitive and inductive effects, a current control source having an output connected to said line to supply a current of a predetermined amplitude thereover, first control means operable to alter the output of said control source to change the amplitude of said current over said line from one level to another, with the time required for said amplitude change being delayed as a function of the impedance of said line, and second control means associated with said line and operable responsive to the said operation of said first control means for applying a compensating current to said line to reduce the said time required for said amplitude change.

2. A circuit arrangement as set forth in claim 1 wherein said second control means for applying a compensating current to said line includes a capacitive device connected to said line having a charging rate controlled by said impedances and wherein said second control means includes charge-control means for increasing the charging rate of said capacitive device.

3. A circuit arrangement as set forth in claim 2 wherein said charge-control means for increasing the said charging rate of said capacitive device comprises current conductive means controlled by the said first control means.

4. A circuit arrangement as set forth in claim 2 wherein the said capacitive device has one side connected to said line and the other side connected to the said charge-control means.

5. A circuit arrangement as set forth in claim 1 wherein variable means is provided for altering the time required for the current on said line to change from its predetermined amplitude to a different amplitude.

6. A circuit arrangement comprising a first amplifier having an output, said output being connected to a transmission line, a second amplifier having an output, said output being connected to said line through a capacitive device, means for operating said first amplifier and controlling the gain thereof to cause a current to flow over said line and to increase to a predetermined amplitude within a predetermined time interval, and means controlled by the operation of said first amplifier for operating the second amplifier to control the charge on said capacitive device to reduce the said time required for said increase.

7. A circuit arrangement comprising a first and a second transistor each having base, emitter and collector electrodes, a transmission line and a power source and means for connecting said line and source in circuit with the emitter and collector electrodes of said first transistor, a capacitive device having a charge storage capability and means for connecting said capacitor in circuit with the emitter and collector electrodes of said second transistor and in circuit with said transmission line, control means for controlling the base electrode of said first transistor to cause a current to flow over said transmission line and to increase to a predetermined amplitude within a first time interval, and means including the emitter electrode of said first transistor for controlling the base electrode of said second transistor to control the charge on said capacitive device to reduce the said first time interval.

8. A circuit arrangement as set forth in claim 7 wherein the said capacitive device is connected between the collector electrode of said first transistor and the collector electrode of said second transistor and wherein the emitter electrode of said first transistor is connected to the base electrode of said second transistor whereby the current flow through said first transistor directly controls the current flow through the said second transistor.

9. A circuit arrangement as set forth in claim 7 wherein adjustable means are included in circuit with said capacitive device to control the duration of said reduced time interval.

10. A circuit arrangement as set forth in claim 9 wherein a collector load impedance is included in circuit with said collector electrode of said second transistor and wherein said adjustable means comprises a variable impedance, the said capacitive device being connected between said network and said transmission line to control the charge on said capacitive device.

References Cited by the Examiner

UNITED STATES PATENTS 3,121,807 2/1964 Stephens ----------- 307—88.5

ARTHUR GAUSS, *Primary Examiner.*

J. ZAZWORSKY, *Assistant Examiner.*